United States Patent [19]
Lette et al.

[11] 3,877,882
[45] Apr. 15, 1975

[54] GAS GENERATING DEVICE

[75] Inventors: Lee Lette; Paul Andre, both of Mesa, Ariz.

[73] Assignee: Talley Industries, Inc., Mesa, Ariz.

[22] Filed: July 27, 1972

[21] Appl. No.: 275,637

[52] U.S. Cl................ 23/281; 9/321; 280/150 AB; 102/39; 55/487
[51] Int. Cl.............................................. B01j 7/00
[58] Field of Search............... 9/11 A, 321; 23/281; 280/150 AB; 102/39; 55/487

[56] References Cited
UNITED STATES PATENTS

| | | | |
|---|---|---|---|
| 1,963,874 | 6/1934 | Stampe................................. | 55/487 |
| 2,973,833 | 3/1961 | Cook..................................... | 55/497 |
| 2,980,204 | 4/1961 | Jordan................................... | 55/487 |
| 3,052,526 | 9/1962 | Cook et al............................ | 23/281 |
| 3,066,014 | 11/1962 | White et al........................... | 23/281 |
| 3,117,424 | 1/1964 | Habenstreit........................ | 23/281 X |
| 3,163,014 | 12/1964 | Wismar................................. | 23/281 X |
| 3,532,360 | 10/1970 | Leising et al. ...................... | 23/281 X |
| 3,618,980 | 11/1971 | Leising et al. ................. | 280/150 AB |
| 3,618,981 | 11/1971 | Leising et al. ..................... | 23/281 X |
| 3,649,045 | 3/1972 | Smith et al......................... | 23/281 X |
| 3,711,115 | 1/1973 | Lohr.................................. | 23/281 X |
| 3,733,180 | 5/1973 | Heineck et al..................... | 23/281 X |

Primary Examiner—James H. Tayman, Jr.

[57] ABSTRACT

A gas generating device is disclosed which includes combined filtering and cooling means through which the gas stream in the device is directed. This means includes specially constructed deflection means for causing the gas stream to undergo a plurality of direction changes each of which is at least 90 degrees.

9 Claims, 4 Drawing Figures

PATENTED APR 15 1975
3,877,882
SHEET 1 OF 2
FIG. 1
FIG. 2
FIG. 3
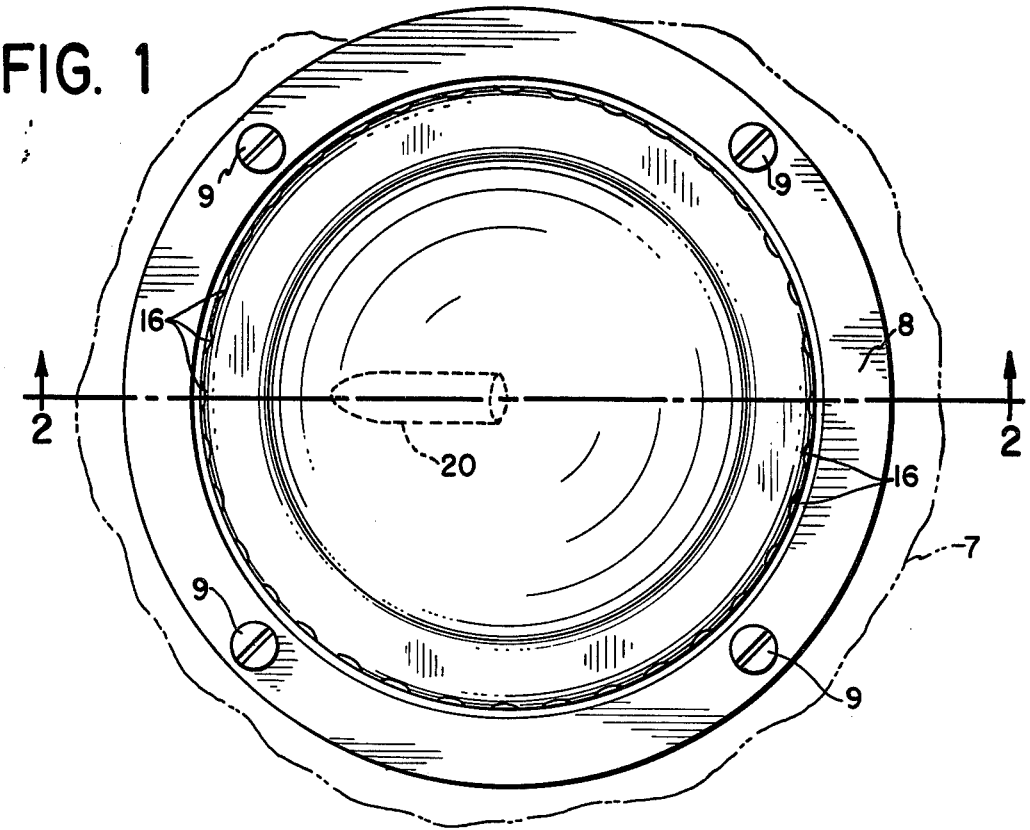
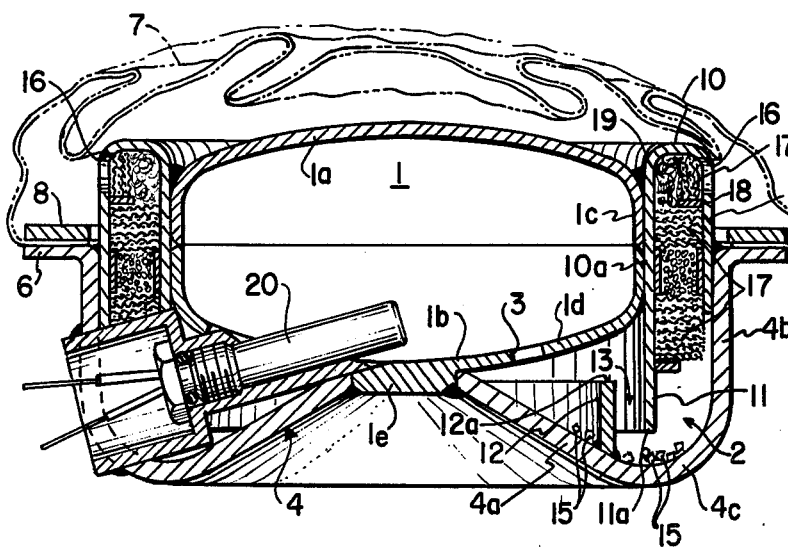
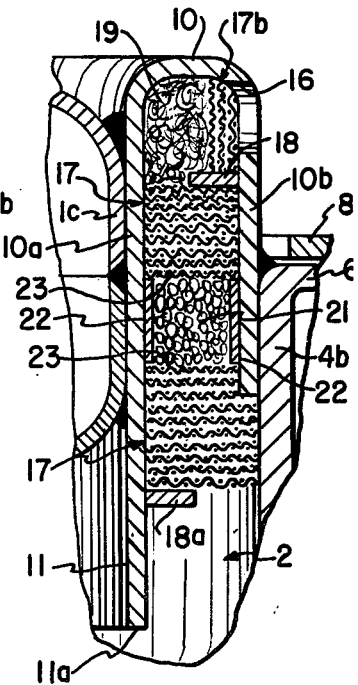

GAS GENERATING DEVICE

BACKGROUND OF THE INVENTION

I. Field of the Invention

This invention relates generally to gas generating devices and, in particular, to such devices in which a gas is generated for inflating an air cushion of the type useful in vehicle restraint systems to protect vehicle occupants upon sudden stopping or deceleration of the vehicle in which they are riding. The air cushion, which is commonly formed of an inflatable bag, acts to prevent the secondary collision between the occupants and interior structural components of the vehicle resulting from the primary collision between the vehicle and another object.

II. Description of the Prior Art

One method commonly proposed for inflating the air cushion of vehicle restraint systems involves the use of a sealed cylinder of compressed gas which communicates with the collapsed bag mounted in the interior of the vehicle. The compressed gas is released by impact responsive actuators or sensors which sense a rapid change in velocity of the vehicle as, for example, when the vehicle collides with another object.

Another method proposed for inflating the air cushion involves the use of an ignitable propellant system, where the inflating gas is generated by the exothermic reaction of the reactants forming the propellant composition.

The bags used in restraint systems of the type described must in order to accomplish their purpose be inflated to a sufficient degree within a very short time span, generally on the order of a few milliseconds. For example, under certain representative conditions only about 60 milliseconds elapse between occurrence of the primary and secondary collisions. In addition, the gas itself must meet several rather stringent requirements. The gas must be nontoxic and non-noxious, and its temperature as it is generated must be low enough not to burn the bag or of itself undermine the mechanical strength of the bag. Furthermore, the temperature of the gas must be sufficiently cool so as not to burn the passengers in the vehicle in the event the bag ruptures.

In addition any solid particles or other impurities present in the generated gas as, for example, particles of unburned propellant, must be removed from the gas within the generator before the gas enters the inflatable bag. Also, it is important that any chemical impurities resulting from the reaction of the propellant composition which might be harmful to vehicle occupants be removed within the gas generating device. Filtering of the gas before entry into the inflatable bag is also necessary so that solid impurities do not in themselves undermine the mechanical strength of the bag. Effective filtering is especially important in connection with chemical impurities as a precautionary measure so that vehicle occupants are not harmed by the gas should the bag rupture.

In the past poromesh screen constructions have been used in gas generating devices to filter solid particles from the generating gas. Examples of prior art screen constructions are disclosed in the following U.S. Pat. Nos.: 2,973,833; 3,618,981; 3,618,976; and 3,052,526. One problem associated with such known screen constructions is their tendency to become clogged by the solid particulate matter thus creating a substantial pressure drop across the filtering screen which undesirably decreases the efficiency of the generator, especially with respect to the time period needed to deliver the gas to the inflatable bag.

Other known prior art gas generating devices intended for use in vehicle restraint systems as above described are disclosed in the following U.S. Pat. Nos.: 2,850,291; 3,450,414; 3,552,770; 3,167,415; 3,425,712; 3,429,583; 3,430,979; 3,451,693; 3,473,824; 3,477,740; 3,516,685; 3,532,359; 3,606,377; 3,532,358; 3,547,467; 3,632,133; 3,618,980; and 3,532,360. Such devices have not been able to deliver gas at a sufficiently low temperature and/or in a sufficiently pure state to reliably avoid danger to vehicle occupants and to avoid presenting a hazard to the mechanical integrity of the bag itself.

The present invention provides a novel gas generating device which delivers a relatively cool and substantially clean gas to an inflatable bag of a vehicle restraint system. The gas generating device of this invention also has general utility in applications other than vehicle restraint systems where stringent requirements are imposed on the temperature and purity of the gas delivered by the device.

SUMMARY OF THE INVENTION

In accordance with the teachings of the present invention a gas generating device is provided which is capable of rapidly generating cool and clean gas. In construction the device includes a combustion chamber containing a reactable gas generating material and a plenum chamber communicating with the combustion chamber for receiving the gas generated from the reaction of the gas generating material contained in the combustion chamber. The plenum chamber serves as both a filtering chamber and a cooling chamber. Outlet means is provided in the plenum chamber to allow the escape of gas into the inflatable bag. In one embodiment the plenum chamber is provided with a pair of spaced apart baffle elements which extend in opposite directions and which are positioned in overlapping relationship to each other such that a channel is formed between the baffle elements through which the gas must pass before entering the plenum chamber. The channel is positioned such that the gas flow from the combustion chamber undergoes a plurality of changes in direction each of at least 90 degrees as it passes through the plenum chamber. With this arrangement turbulence is created in the gas stream which aids in cooling and the gas flow is subjected to a trapping action each time it changes direction. This trapping action serves to remove particulate matter entrained in the gas. Also, for the purpose of augmenting the cooling action of the baffle elements a plurality of metallic chips are dispersed in the plenum chamber to act as individual heat sinks for absorbing heat from the generated gas.

The plenum chamber is also equipped with a plurality of screen members of various size open-mesh construction. The screen members are arranged in successive layers of decreasing mesh size in direction of gas flow. With this arrangement the problem of clogging is substantially eliminated.

BRIEF DESCRIPTION OF THE DRAWINGS

FIG. 1 is a top plan view of one embodiment of the gas generating device of the present invention.

FIG. 2 is a cross sectional view of the embodiment shown in FIG. 1 taken along the line 2—2 of FIG. 1.

FIG. 3 is an enlarged cross sectional view of a portion of the plenum chamber of the embodiment of this invention shown in FIG. 1.

DETAILED DESCRIPTION OF THE INVENTION

Figure 4:
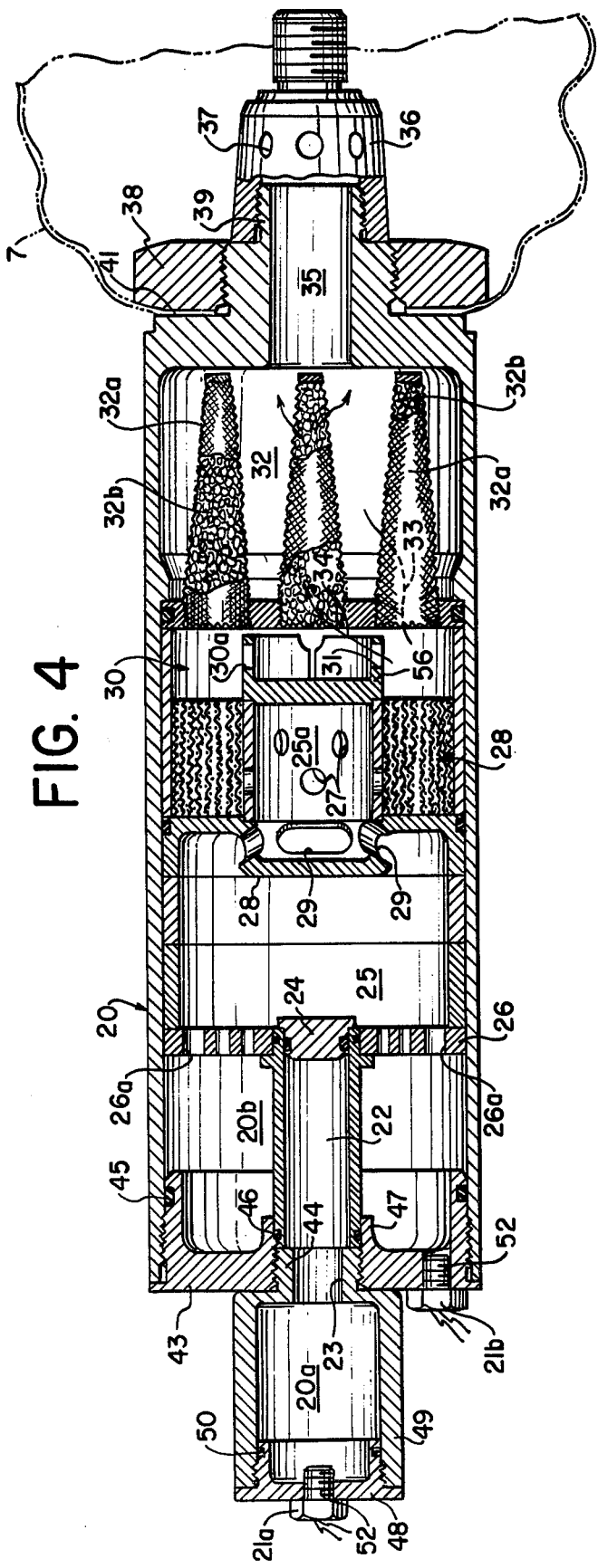
FIG. 4 is a cross sectional view of another embodiment of a gas generating device according to this invention.

With reference to FIGS. 1 and 2 the gas generating device includes a combustion chamber 1 providing a combustor compartment and a plenum chamber 2 which communicates with the combustion chamber through a ring of outlet ports 3. The combustion chamber which includes top and bottom walls 1a and 1b and cylindrical side wall 1c has a circular cross sectional shape as viewed from the top in FIG. 1 and a generally truncated oval cross sectional shape as viewed from the side in FIG. 2. The outlet ports 3 are located on the sloping surface portion 1d of bottom wall 1b. Advantageously because of the orientation of sloping surface 1d with respect to the plenum chamber substantially all of the gas flow from the combustion chamber is directed toward the base of baffle element 12 to be described more fully hereinafter.

Plenum chamber 2 is formed by a generally V-shaped wall member 4 having legs 4a and 4b joined together by a rounded neck portion 4c. One end of the wall 4 is connected in abutting relationship to external hub 1e which is centrally positioned with respect to combustion chamber 1. The other end of the wall 4 is provided with an outwarding projecting flange element 6 forming a seating surface for the inflatable bag 7 which is held in place by clamping ring 8 secured to flange 6 by bolts 9.

As shown, leg 4b is spaced from side wall 1c of combustion chamber 1 by an annular inverted U-shaped cap 10 which defines a housing for filtering components all of which will be described more fully hereinafter. The inner wall 10a of cap 10 extends downward past the midpoint of the lower section of the plenum chamber and terminates at a point which is spaced apart from the neck portion 4c of wall 4. This extension of inner wall 10a defines a baffle element 11. Extending upwardly from the leg 4a of the plenum chamber wall 4 is a second baffle element 12 which is positioned in spaced apart relationship to baffle element 11 to thereby define a channel 13 extending between baffle elements 11 and 12. The gas flow from the combustion chamber will be forced into a subchamber of the plenum chamber around baffle 12 through channel 13 and then into a second subchamber of the plenum chamber to contact with the neck portion 4c of wall 4 which it will be seen acts to redirect the gas upward in the opposite direction from the direction of flow through channel 13. With this construction, the gas is caused to undergo a series of changes in direction as it flows through the plenum chamber. To maximize trapping action the first directional change occurs at the base of baffle 12 to which point, as previously mentioned, substantially all of the gas exiting from the combustion chamber is initially directed due to the location and orientation of the outlet ports 3 previously described. As the gas stream impinges on this point it is deflected through an angle of about 130° along baffle 12. When the gas stream reaches the free end 12a of baffle 12 the gas is again deflected as it impinges upon the external side of sloping surface 1d through an angle of approximately 180° into channel 13. Upon exiting from channel 13 after passing the free end 11a of baffle 11 the gas impinges on the neck portion 4c of wall 4 which acts to again change the direction of flow through an angle of approximately 180°. The last change in direction of the gas flow through an angle of about 90° occurs at the remote end of cap member 10 where the gas flow is deflected through an angle of about 90° into discharge ports 16 in outer wall 10b of cap 10. Each time the gas stream undergoes a change in direction turbulence is created which advantageously acts to cool the gas. Additionally, and more importantly, each point of change in direction of the gas flow acts as a trap creating a filtering action which advantageously operates to remove particulate matter entrained in the gas stream. To maximize trapping action and to minimize resistance to gas flow it is preferred that each directional change be less than 180°.

For the purpose of augmenting the cooling action created by directional changes in the gas stream a plurality of metallic chips 15 are randomly placed in the plenum chamber on both sides of the baffle 12 and in neck portion 4c. Each individual chip advantageously acts as a heat sink to absorb heat from the gas as it passes through the plenum chamber.

With reference now to FIG. 3 the filtering components housed within cap 10 include a plurality of screen members 17 which are arranged in successive layers between retaining rings 18 and 18a which hold the screen members in place. Retaining rings 18 and 18a extend about half way into the filtering section from opposite legs 10a and 10b respectively of cap 10. The screen members 17 have a varying size open-mesh construction and are arranged in order of decreasing mesh size in the direction of gas flow through the plenum chamber.

Coarse particles still entrained in the gas stream upon reaching the screening layers are filtered out in the initial screen layers with the filtering action continuing by successively screening out decreasing size particles as the gas passes through the screen layers of decreasing mesh size. With this arrangement the tendency of heretofore known filtering screen constructions to clog is substantially eliminated. The metal screen members also act as a heat sink to provide additional cooling of the gas.

After passing through the primary screen system the gas is directed through a quantity of steel wool 19 for filtering of very fine particles and then through a series of secondary screening layers which consist of a plurality of screen members 17b also of varying size open mesh construction. Screen members 17b are provided primarily as retaining members to prevent the steel wool from being blown out of the device although they do provide additional filtering action.

In the presently preferred embodiment of the invention the gas generating material used is a solid propellant which is thermally ignited by means of a conventional electrical squib 20 projecting into the combustion chamber 1. The squib is responsive to inertial actuators (not shown) which detect rapid changes in vehicle velocity. With certain solid propellants chemical impurities are produced as reaction products which present a hazard to human beings. Thus, in order to remove such chemical impurities, provision is made according to the invention to chemically neutralize such impurities. For this purpose a quantity of a suitable chemical compound shown in the form of tablets 21 is contained within a housing disposed between two successive screen layers. The housing is bounded on the sides by side plates 22 and on the top and bottom by screen members 23.

Another embodiment of this invention having a two-stage inflation cycle is shown in FIG. 4. With reference now to FIG. 4, it will be seen that the gas generator includes a elongated cylindrical housing 20. The outlet end of the housing 20 is provided with a centrally located bore 35 through which gas escapes via discharge ports 37 provided in the periphery of end cap 36 which threadedly engages neck 39. Structure in the form of a manifold (not shown) may be provided to mountingly support the inflatable air cushion bag 7 to the cylindrical housing 20. The nut 38 illustrated in the Figure for clamping the inflatable air cushion bag against the shoulder 41 may be disposed within the manifold in an accessible position to be manipulated to achieve the clamping action required.

The gas generating device includes, as in the embodiment described in connection with FIGS. 1 through 3, a combustion chamber and a communicating plenum chamber. The combustion chamber is divided into dual combustor compartments 20a and 20b and the plenum chamber is divided into 5 intercommunicating sub-chambers 25, 25a, 30, 30a and 32.

The combustor compartment 20a has a generally cylindrical shape and the combustor compartment 20b is annular in shape and surrounds a gas outlet bore 22 extending centrally through combustor compartment 20b into combustor compartment 20a via outlet bore 23. The other end of bore 22 is fitted with a blow-out plug 24 which is freed by the pressure of the gas stream emanating from combustor compartment 20a.

Combustor compartment 20b is bounded at one end by cap 43 which is internally threaded to housing 20. As shown, one end of the cylindrical combustor compartment 20a is provided with a neck 44 which threadedly engages cap 43 such that outlet bore 23 in neck 44 and outlet bore 22 are aligned. O-ring 45 is disposed between cap 43 and the internal wall of housing 20 to seal combustor compartment 20b in gas tight relationship. A similar O-ring 46 is disposed between the exterior surface of bore 22 and the internal central neck portion 47 of cap 43 for the same purpose. The end of combustor compartment 20a remote from the end having neck 44 is provided with cap 48 which is internally threaded to the wall 49 of combustor compartment 20a. O-ring 50 is disposed between the cap 48 and wall 49 to seal combustor compartment 20a in gas tight relationship. Squibs 21a and 21b are seated in bores 52 and 53 formed in caps 48 and 43, respectively, as shown.

Combustor compartment 20b and the plenum chamber are separated by an internal wall 26 which is provided with a series of outlet ports 26a through which gas passes from combustor compartment 20b. Combustor compartments 20a and 20b are individually actuable by electrical squibs 21a and 21b respectively. Both squibs are actuated by impact responsive inertial sensors (not shown) which detect rapid changes in vehicle velocity. The purpose of the compartmentalized combustion chamber is to provide inflation of the air cushion bag at different pressures depending upon the degree of impact. In the construction shown squib 21b is operatively connected to an inertial sensor which detects vehicle impacts up to a predetermined rate of speed, say 15 m.p.h., and the squib 21a is operatively connected to an inertial sensor which activates at higher speed impacts. Two stage gas generators of this type are particularly advantageous for protecting small children riding in vehicles equipped with such a generator. At low speed impact the air cushion is not inflated to maximum pressure and thus the danger of a small child being thrown into the rear passenger seat by the force of the inflating air cushion is substantially eliminated.

It is to be recognized that combustor compartment 20b has a larger volume than combustor compartment 20a and thus has a larger propellent containing capacity. As mentioned above combustor compartment 20b in the construction shown is actuated by low speed impacts. It is also to be recognized that the air cushion bag is fully collapsed before impact and in order to be inflated the pressure within the bag must be brought to atmospheric pressure and then slightly higher to accomplish its purpose. On the other hand combustor compartment 20a which is utilized for high speed impacts need only supply additional gas sufficient to pressurize the air cushion bag to a value slightly higher than the pressure level supplied by the gas generated in the low speed combustor compartment 20b. It is for this reason that combustor compartment 20b has a larger volume then combustor compartment 20a.

Passage of gas into sub-chamber 25a from sub-chamber 25 is provided by a hub member 28 which extends centrally into chamber 25. The hub member 28 is provided with a series of peripheral entry ports 29 which provide a radial entry path to chamber 25a. The hub member 28 acts to redirect the gas stream into the sub-chamber 25a through an angle of about 90° thus inducing turbulence which has a cooling effect on gas. Upon leaving subchamber 25a the gas is directed via exit ports 27 through a series of annularly arranged screen member 28 constructed in accordance with the invention. After passing the screen members 28 the gas enters the sub-chamber 30 from which it can proceed in two directions through cone-shaped secondary filtering system consisting of a cluster of cone-shaped screen members 32a located in sub-chamber 32. The first path of travel from the outlet chamber 30 is directly into the cone shaped filtering members 32a as indicated by arrow 33. The second path of entry to the secondary filtering system is through open-ended directional sub-chamber 30a which is defined by hub member 56 having a series of peripheral inlet ports 31. The sub-chamber 30a acts to again redirect a portion of the gas flow along the path indicated by arrow 34 from which point the gas flows into the centrally located cone screens in sub-chamber 32. After passing through the cone screens 32a the gas continues through outlet bore 35 into outlet chamber 36 from which point it escapes from the generator into inflatable gas bag through outlet ports 37. Optionally, chemical neutralizing tablets 32b may be disposed within cone screens 32a for the same purpose as described above in connection with the embodiment shown in FIGS. 1–3.

It is to be recognized that the gas flow is subjected to series of changes in direction which have the same beneficial results of cooling and filtering as described above in connection with the embodiment shown in FIGS. 1–3. The first directional change through an angle of approximately 90° occurs as the gas passes from sub-chamber 25 into sub-chamber 25a. The next directional change (also through an angle of approximately 90°) occurs as the gas passes through filtering screens 28 from sub-chamber 25a into sub-chamber 30. Finally, a portion of the gas is subjected to a further directional change through an angle of about 90° as it passes out of directional sub-chamber 30a into sub-chamber 32.

The above description has been made with respect to the preferred embodiments of the invention. However, it is to be recognized that various modifications can be made to the invention without departing from the spirit and scope of the appended claims.

We claim:

1. A gas generating device comprising:
   a. a housing;
   b. a pair of chambers within said housing,
      1. one of said chambers providing at least one combustor compartment, each said combustor compartment containing a reactable gas generating material, and
      2. the other of said chambers providing a plenum chamber including a plurality of inter-communicating sub-chambers;
   c. means within each said combustor compartment for initiating reaction of the reactable gas generating material;
   d. wall means supported by said housing separating said chambers;
   e. inlet means formed in said wall means communicating a flow including gas and particulate phase from each said combustor compartment into a sub-compartment of said other chamber;
   f. outlet means formed in said housing, said outlet means disposed in communication with the last of said inter-communicating sub-compartments;
   g. deflection means within said plenum chamber for acting upon said flow both to cool said gas phase and to trap a portion of said particulate phase, said deflection means supported by said housing between said inlet and outlet means for causing said flow during movment through said inter-communicating sub-chambers toward said outlet to undergo a plurality of substantially common changes in direction, each change in direction being at least 90°, and each change introducing turbulence to said flow resulting in cooling of said gas phase and trapping of particulate from said particulate phase;
   h. filter means including at least one plurality of screen members of varying size poromesh construction arranged in successive layers of decreasing mesh size; and,
   i. means mounting said screen members in one of said inter-communicating sub-chambers in the path of said flow and with said decreasing mesh size in the direction toward said outlet to complete substantially trapping of said particulate phase so that only said cooled gas phase passes from said outlet.

2. A gas generating device comprising:
   a. an elongated housing;
   b. a combustion chamber within said housing, substantially at one end thereof, said combustion chamber including at least one combustor compartment, each said combustor compartment containing a reactable gas generating material;
   c. means within each said combustor compartment for initiating reaction of said reactable gas generating material;
   d. a plenum chamber including a plurality of inter-communicating sub-chambers within said housing toward the other end, said sub-chambers being located in offset relation to each other;
   e. wall means supported by said housing separating said combustion chamber and plenum chamber;
   f. inlet means formed in said wall means for communicating a flow including gas and particulate phase from said combustion chamber to a first of said inter-communicating sub-chambers;
   g. outlet means formed in said housing, said outlet means communicating with the last of said inter-communicating sub-chambers; and
   h. deflection means within said plenum chamber means for acting upon said flow both to cool said gas phase and to trap particulate of said particulate phase, said deflection means supported by said housing between said inlet and outlet means for causing said flow during movement through said plenum chamber to undergo a plurality of substantially common changes in direction through said inter-communicating sub-chambers toward said outlet means, said changes in direction through said inter-communicating sub-chambers being at least 90° and generally alternately from one of a radially outward and a radially inward direction to the other said directions, and each change in direction introducing turbulence to said flow resulting in cooling of said gas phase and trapping of particulate from said particulate phase.

3. A gas generating device according to claim 2 wherein the first sub-chamber which communicates with the combustion chamber is provided with a hub member extending toward the combustion chamber and having a plurality of peripheral inlet ports permitting passage of gas into a second sub-chamber.

4. A gas generating device according to claim 3 wherein at least one of said sub-chambers contains an open ended hub member having a series of peripheral inlet ports such that at least a portion of the flow through said one sub-chamber is caused to enter into the hub member before passing into the next sub-chamber whereby said portion of said flow is caused to undergo at least one change in direction of at least 90° as it passes through said one sub-chamber.

5. The gas generating device according to claim 3 wherein said combustion chamber means includes a plurality of individually and independently actuatable combustor compartments disposed in communicating relationship to said plenum chamber.

6. The gas generating device according to claim 2 further comprising:
   i. screen filter means;
   j. means mounting said screen filter means in one of said inter-communicating sub-chambers in the path of said flow, said screen filter means acting to complete substantially trapping of particulate of said particulate phase so that only said cooled gas phase passes from said outlet means.

7. A gas generating device comprising:
   a. a housing;

b. a combustion chamber including at least one combustor compartment within said housing, each said combustor compartment containing a reactable gas generating material;

c. a plenum chamber including at least one subchamber within said housing, said plenum chamber partially surrounding said combustion chamber;

d. means within each said combustor compartment initiating reaction of said reactable gas generating material;

e. a wall supported by said housing, said wall separating said plenum chamber from said combustion chamber;

f. inlet means formed in said wall, said inlet means communicating a flow including gas and particulate phase from said combustion chamber to said plenum chamber;

g. outlet means formed in said housing in fluid communication with said plenum chamber; and h. deflection means within said plenum chamber between said inlet and outlet means, said deflection means including a plurality of baffle elements for causing said flow through said plenum chamber to undergo a plurality of directional changes of at least 90° toward said outlet with each change in direction of flow introducing turbulence to said flow resulting in cooling of said gas phase and trapping of particulate from said particulate phase, first and second of said baffle elements supported by said housing in oppositely directed and in generally parallel overlapping relation to define a passage therebetween.

8. The gas generating device according to claim 7 wherein said inlet means includes a plurality of ports arranged substantially in a ring, and said first and second baffle elements are annular in form and concentric with said ports.

9. The gas generating device according to claim 7 further comprising:

i. screen filter means; and j. means mounting said screen filter in said plenum chamber in the path of said flow for completing substantially trapping of particulate of said particulate phase so that only said cooled gas phase passes from said outlet means.

* * * * *